United States Patent
Wu et al.

(10) Patent No.: US 8,238,247 B2
(45) Date of Patent: Aug. 7, 2012

(54) SYSTEM AND METHOD FOR PROACTIVE REPEAT TRANSMISSION OF DATA OVER AN UNRELIABLE TRANSMISSION MEDIUM

(75) Inventors: Shiquan Wu, Nepean (CA); Jung Yee, Ottawa (CA)

(73) Assignee: Wi-LAN, Inc., Ottawa (CA)

( * ) Notice: Subject to any disclaimer, the term of this patent is extended or adjusted under 35 U.S.C. 154(b) by 769 days.

(21) Appl. No.: 12/410,807

(22) Filed: Mar. 25, 2009

(65) Prior Publication Data

US 2010/0246472 A1   Sep. 30, 2010

(51) Int. Cl.
 *H04L 1/00* (2006.01)
(52) U.S. Cl. .......................... 370/236; 370/235; 714/748
(58) Field of Classification Search .................. 370/229, 370/235, 236, 241, 248; 714/100, 1, 2, 15, 714/18, 699, 746, 748, 749
 See application file for complete search history.

(56) References Cited

U.S. PATENT DOCUMENTS

| | | | |
|---|---|---|---|
| 7,209,483 B2 * | 4/2007 | Tran et al. | 370/394 |
| 7,236,740 B2 * | 6/2007 | Koo et al. | 455/13.4 |
| 8,064,475 B2 * | 11/2011 | Henry | 370/433 |
| 2002/0122381 A1 | 9/2002 | Wu et al. | |
| 2005/0041574 A1 | 2/2005 | Wu et al. | |
| 2009/0013232 A1 * | 1/2009 | Wan et al. | 714/748 |

OTHER PUBLICATIONS

International Search Report and Written Opinion as issued in International Patent Application No. PCT/CA2010/000335 on Apr. 27, 2010, 7 pages.

* cited by examiner

*Primary Examiner* — Chi Pham
*Assistant Examiner* — Weibin Huang
(74) *Attorney, Agent, or Firm* — Procopio, Cory, Hargreaves & Savitch LLP

(57) ABSTRACT

A system and method for proactive repeat transmission of data units sent using an unreliable transmission medium for the delivery of time sensitive data content predicts a future condition of a downlink data distribution channel using current channel estimation information. The predicted channel condition is used to determine which data units in a next data frame are likely to decode incorrectly, and a repeat transmission of those data units is explicitly requested by the receiving equipment, or automatically scheduled by the sending equipment using time domain channel state information provided to the sending equipment by the receiving equipment.

17 Claims, 12 Drawing Sheets

SYSTEM AND METHOD FOR PROACTIVE REPEAT TRANSMISSION OF DATA OVER AN UNRELIABLE TRANSMISSION MEDIUM

RELATED APPLICATIONS

This is the first application filed for this invention.

FIELD OF THE INVENTION

This invention relates in general to data communications using an unreliable transmission medium, such as a wireless communications medium, and, in particular, to a system and method for proactive repeat transmission of data units sent using the unreliable transmission medium.

BACKGROUND OF THE INVENTION

Data communication systems consist of sending equipment and receiving equipment. Data units transmitted by the sending equipment using an unreliable transmission medium (wireless link, power distribution network, etc.) cannot be guaranteed to reach the receiving equipment in a decodable state due to transmission medium imperfections and environmental influences, such as thermal noise, fading, interference, equipment manufacturing errors, etc. Consequently, any data unit may be lost during transmission or be received in a condition that does not permit the receiving equipment to correctly decode that data unit. Automatic Repeat Request (ARQ) is a commonly implemented protocol for combating data unit loss and controlling errors to improve Quality of Service (QoS).

When the ARQ protocol is implemented, the sending equipment transmits a number of data units (packets, frames or symbols, for example) within a predefined transmit time window. The receiving equipment is aware of the duration of the transmit time window. After sending the data, the sending equipment expects to receive an acknowledgement from the receiving equipment within a predefined response time window. The acknowledgement identifies each packet that has been received (or has not been received, depending on the implementation). The sending equipment uses the acknowledgement to determine whether some or all of the packets have to be retransmitted. If an acknowledgement is not received within the response time window, the sending equipment may transmit new data units or retransmit all the data units sent in the previous transmit time window, again depending on the implementation. If the sending equipment retransmits some or all of the data units, the receiving equipment reprocesses them and acknowledges once more, and so on. The way in which the data is reprocessed by the receiving equipment depends on the ARQ protocol implementation. When the ARQ protocol is implemented in data link layer the protocol generally discards the original data unit(s) and decodes the resent data unit(s). Hybrid ARQ, which is generally implemented in the physical layer, combines the resent data unit(s) with the original data unit(s) before attempting to decode the data unit(s). ARQ protocols can be roughly grouped into the following categories.

Stop-and-wait ARQ: The sending equipment transmits one data unit at a time. After transmitting each data unit, the sending equipment waits during a wait time window (also referred to as a "time out") for an acknowledgement from the receiving equipment. If the receiving equipment is able to decode the data unit correctly, it sends back an acknowledgement to the sending equipment. The sending equipment then sends the next data unit. If the sending equipment does not receive the acknowledgement during the wait time window, it re-sends the same data unit and repeats the process until it receives an acknowledgement from the receiving equipment. Stop-and-wait ARQ is not bandwidth efficient because each data unit requires an acknowledgement that can only be sent after the data unit has been received, demodulated and decoded.

Go-Back-N ARQ: The sending equipment sends a block of sequentially numbered data units during a transmit time window without waiting for an acknowledgement. The receiving equipment tracks the sequence number of a next data unit it expects to receive, and sends that number with each acknowledgement it sends back to the transmitter. The receiving equipment ignores any data unit that does not have the expected sequence number, i.e. the receiving equipment discards any data unit that is out of sequence and sends a REJ (reject) message to the sending equipment that identifies the sequence number of any missing data unit. After a REJ message is sent, the receiving equipment waits for the identified data unit. When the sending equipment receives the REJ message, the sending equipment retransmits the identified data unit as well as each subsequent data unit even if those data units have already been sent. Go-Back-N ARQ is more efficient than Stop-and-Wait ARQ but it is still suffers from inefficiency due to the repeat transmissions when a data unit is lost.

Selective Repeat ARQ: The sending equipment sends a number of data units determined by a transmit window size, regardless of any data unit loss. Unlike Go-Back-N ARQ, the receiving equipment accepts and acknowledges data units sent after a data unit is lost or cannot be decoded. The receiving equipment keeps track of the sequence number of the earliest data unit it has not received or has not been able to decode, and sends that sequence number with every acknowledgement returned to the sending equipment. The receiving equipment continues to fill its receiving window with the subsequent data units, replying each time with an acknowledgement containing the sequence number of the earliest missing data unit. Once the sending equipment has sent all the data units in it's transmit window, it re-sends the data unit specified by the sequence number received in the acknowledgement messages. After resending the missing data unit, the sending equipment picks up where it left off with the last sent data unit.

With Selective Repeat ARQ, the size of the transmit window and the receive window must be identical and must accommodate a number of data units that is equal to half of the maximum sequence number (assuming that the data units are numbered from 0 to n-1) in order to avoid miscommunication when data units are dropped. The sending equipment moves the transmit window forward each time a data unit is acknowledged by the receiving equipment.

When variable length messages are sent, the probability of error-free reception diminishes in inverse proportion to increasing message length. Consequently, if standard ARQ protocols are used to transmit variable length messages there is increased difficulty delivering longer messages because each repeat resends the entire message. Selective retransmission applied to variable length messages eliminates the difficulty in delivering longer messages because successfully delivered data units are retained by the receiving equipment after each transmission, and the number of undelivered data units in following transmissions is reduced. However, all known ARQ protocols suffer from the drawback that the repeat request is reactive and can only be sent after an attempt has been made to decode a data unit. While the reactive repeat request may be acceptable for data applications that are not time sensitive, it can severely impact the QoS of time critical applications such as television, streaming video, voice, multimedia, etc.

There therefore exists a need for a method and system for proactive repeat transmission to improve the QoS of data delivered using an unreliable transmission medium.

SUMMARY OF THE INVENTION

It is therefore an object of the invention to provide a system and method for proactive repeat transmission to improve the QoS of data delivered using an unreliable transmission medium.

The invention therefore provides a system for proactive repeat transmission of data units sent using an unreliable transmission medium, comprising: sending equipment adapted to receive a proactive repeat transmission request lists and schedule the repeat transmission of data units specified in each proactive repeat transmission request list after data units associated with the proactive repeat transmission request list have been sent using the unreliable transmission medium; and receiving equipment adapted to analyze data units received via a downlink channel used by the sending equipment to predict a condition of that downlink channel during a next transmission interval, and further adapted to construct the proactive repeat transmission request lists using the predicted condition, and to send a proactive repeat transmission request list to the sending equipment via an uplink channel before the data units associated with the proactive repeat transmission request list have been sent.

The invention further provides a system for proactive repeat transmission of data units sent using an unreliable transmission medium, comprising: sending equipment adapted to receive time domain channel state information and to analyze the time domain channel state information to construct a proactive repeat transmission request list; and, further adapted to schedule the repeat transmission of data units specified in the proactive repeat transmission request list after data units associated with the proactive repeat transmission request list have been sent using the unreliable transmission medium; and receiving equipment adapted to analyze data units received via a downlink channel used by the sending equipment to: compute the time domain channel state information; and, predict a condition of that downlink channel during a next transmission interval; and further adapted to construct a corresponding proactive repeat transmission request list using the predicted condition of the downlink channel.

The invention yet further provides a method of sending data units to receiving equipment using an unreliable transmission medium, comprising: computing a predicted condition of a downlink channel over which a predetermined number of the data units are to be sent, to determine which of the predetermined number of the data units to be sent are data units likely to decode incorrectly; and scheduling a proactive repeat transmission of the data units likely to decode incorrectly so that the proactive repeat transmission of the data units occurs after the predetermined number of data units are sent by sending equipment to the receiving equipment via the downlink channel.

The invention still further provides a method of sending high-definition television content to receiving equipment using TV white space bandwidth, comprising: computing a predicted condition of the TV whitespace bandwidth over which a predetermined number of data units of the high-definition television content are to be sent, to determine which of the predetermined number of the data units to be sent are data units likely to decode incorrectly; and scheduling a proactive repeat transmission of the data units predicted to decode incorrectly so that those data units likely to decode incorrectly are sent after the predetermined number of data units are sent by sending equipment to the receiving equipment via the white space bandwidth.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a system and method for proactive repeat transmission of data units sent using an unreliable transmission medium. A primary use of the invention is improving quality of service for the delivery of QoS and time sensitive data content, such as television, video, voice, multimedia and the like. In accordance with the invention, a future condition of a downlink data distribution channel is predicted using current channel estimation information collected by receiving equipment. The predicted channel condition is used to determine which data units to be sent in a next transmit interval are likely to decode incorrectly, and a repeat transmission of those data units is explicitly requested by the receiving equipment, or automatically scheduled by the sending equipment using time domain channel state information provided by the receiving equipment to the sending equipment. After the data units for the next transmit interval are sent, the data units likely to decode incorrectly are repeated. The receiving equipment is aware of the number and order of the data units to be repeated, and combines each repeated data unit with the original data unit before decoding for content output is commenced. The likelihood of a correct decoding of the data units is therefore significantly improved, as is the QoS of the received signal.

Figure 1:
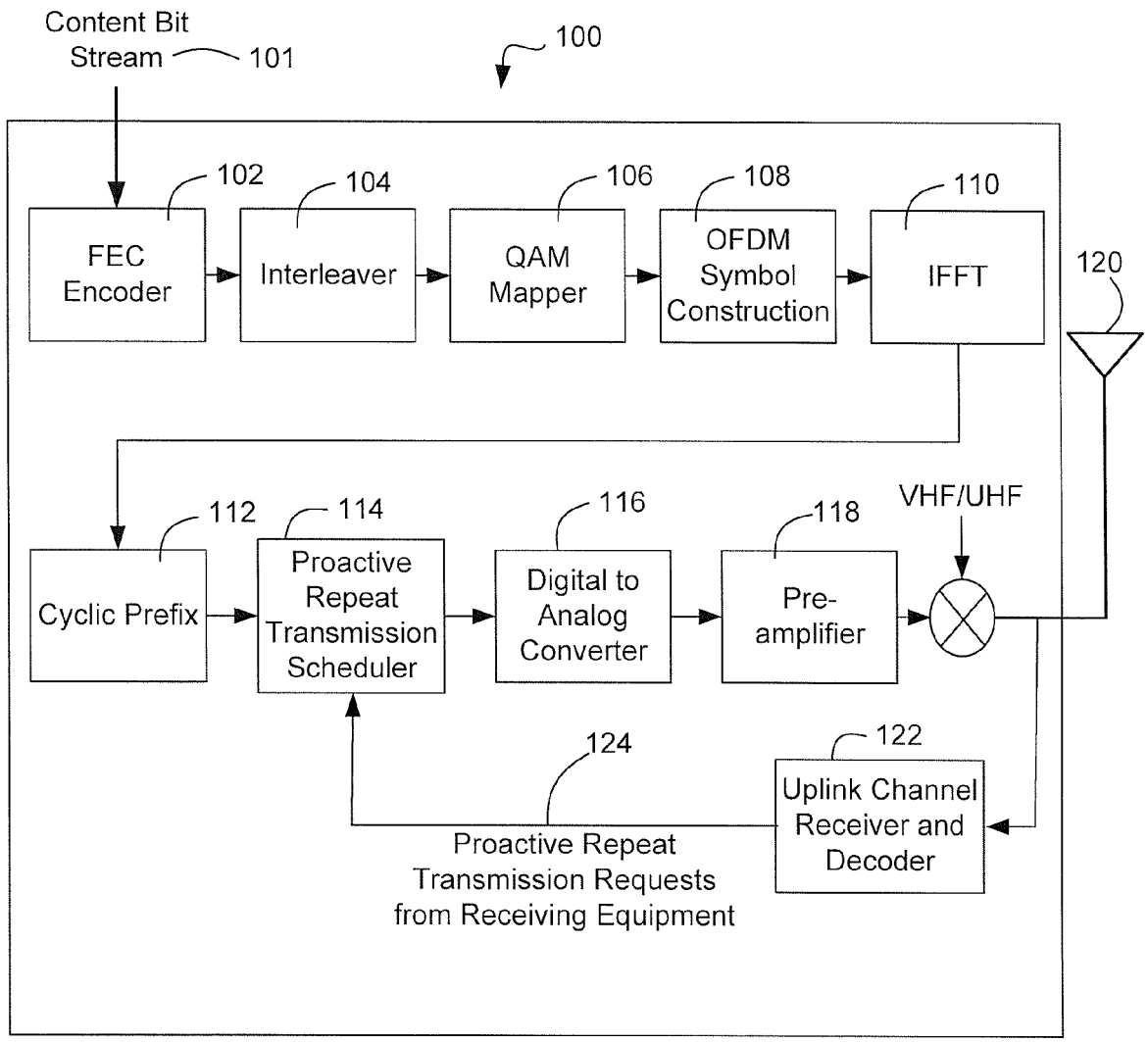
FIG. 1 is a schematic diagram of one embodiment of sending equipment provisioned to provide proactive repeat transmission in accordance with the invention.

FIG. 1 is a schematic diagram of sending equipment 100 provisioned to provide proactive repeat transmission in accordance with the invention. In this disclosure "sending equipment" means any transmitter or any signal propagator capable of executing a communications protocol under which data is sent to receiving equipment in the form of packets, frames, data symbols, or any combination thereof. Although the invention will be described with reference to sending equipment intended for primary use for the wireless distribution of high-definition television signals, it is to be understood that the architecture of the sending equipment described is exemplary only and the scope of the invention is in no respect limited to the particular sending equipment disclosed.

As shown in FIG. 1, the sending equipment 100 receives a content bit stream 101 from a content provider, for example a high-definition television signal provider. The content bit stream may originate from any known content source. It should be noted that for the sake of simplicity only major components of the sending equipment 100 are shown. It should also be understood that the particular arrangement of components is schematic; exemplary only and not required for implementing the invention.

A forward error correction (FEC) encoder 102 encodes the source bit stream 101 to provide error correction capability in a received signal transmitted by the sending equipment 100 using antenna 120. An encoded data interleaver 104 scrambles the encoded data bits in a manner well known in the art to protect the transmitted signal against burst errors. A quadrature amplitude modulation (QAM) mapper 106 maps each group of the interleaved data bits to a complex data point. As understood by those skilled in the art the number of data bits mapped to each complex data point is dependent on the QAM modulation scheme. An orthogonal frequency-division multiplexing (OFDM) symbol constructer 108 formats the QAM data with pilot signals and zeros to properly organize the OFDM symbols for an inverse fast Fourier transform (IFFT) 110. The IFFT 110 transforms the time domain OFDM symbols into a frequency domain representation of the same length. A cyclic prefix (CP) function 112 appends a cyclic prefix consisting of an end of the OFDM symbol copied into a guard interval. Framed OFDM symbol data (IFFT output plus the CP) is tagged and copied into a buffer in a proactive repeat transmission scheduler (PRTS) 114 in accordance with the invention, the function of which will be described in detail below. The PRTS 114 serially feeds the OFDM symbols to a digital to analog converter (DAC) 116. As will be explained in more detail below, appended to each frame of OFDM symbols sent by the sending equipment 100 are any OFDM symbols in the frame that have been predicted to be likely to decode incorrectly due to predicted interference or other environmental influences on the sent signal received by receiving equipment. The output of the DAC 116 is amplified by a pre-amplifier 118 and synthesized with a VHF or UHF frequency before it is transmitted via the antenna 120, which is used to transmit on a downlink channel and receive on an uplink channel. As will be understood by those skilled in the art, separate send and receive antennas may also be used.

In order to function properly, the PRTS 114 requires channel state information from the receiving equipment to which the content bit stream is sent. In this embodiment, the channel state information is provided in the form of a proactive repeat transmission request list 124 sent by the receiving equipment to the sending equipment 100 via the uplink channel. The proactive repeat transmission request list 124 is received by the antenna 120 and decoded by an uplink channel receiver and decoder 122. The components of the uplink channel receiver and decoder 122 are dependent on the communications protocol, as is well known in the art. In accordance with one embodiment of the invention, the proactive repeat transmission request list 124 is a single-bit representation of each OFDM symbol to be transmitted in a next data frame. Each bit indicates whether the corresponding OFDM symbol is predicted to decode correctly. By way of example, a "1" represents an OFDM symbol that is predicted to decode correctly, while a "0" represents an OFDM symbol that is predicted to decode incorrectly. Consequently, if the sending equipment receives a proactive repeat transmission request list containing a first bite "11111100", the $7^{th}$ and $8^{th}$ OFDM symbols sent in the next frame will be repeated, i.e. the $7^{th}$ and $8^{th}$ OFDM symbols will be scheduled to be sent after the frame is sent. As will be explained below with reference to FIG. 5, any frame that does not decode correctly is discarded. In some implementations, the last correctly decoded frame may be inserted into a content bit output stream in lieu of a discarded frame.

Figure 2:
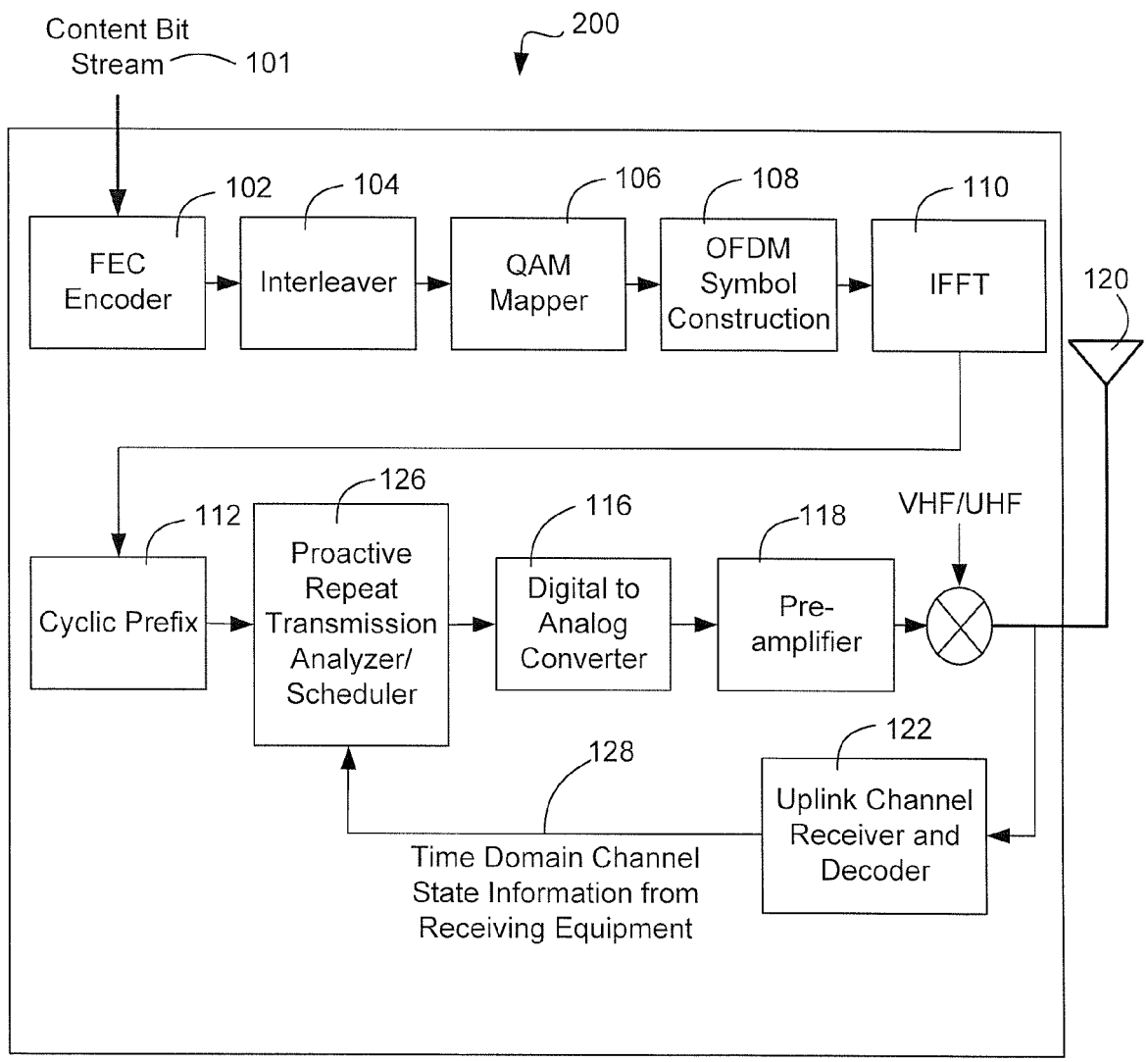
FIG. 2 is a schematic diagram of another embodiment of sending equipment provisioned to provide proactive repeat transmission in accordance with the invention.

FIG. 2 is a schematic diagram of sending equipment 200 provisioned to provide proactive repeat transmission in accordance with the invention. The sending equipment 200 is identical to the sending equipment 100 described above, except that the sending equipment 200 is provisioned with a proactive repeat transmission analyzer/scheduler 126. In addition to performing all of the functions described above with reference to the proactive repeat transmission scheduler 124, the proactive repeat transmission analyzer/scheduler 126 receives time domain channel state information 128 from the sending equipment on the uplink channel. The time domain channel state information 128 is processed and decoded by the uplink channel receiver and decoder 122. The time domain channel state information 128 consists of about 20 complex numbers that are derived from channel estimation information by sending equipment 600 (see FIG. 6), as will be explained below in more detail with reference to FIG. 6. The time domain channel state information is used by the proactive repeat transmission analyzer/scheduler 126 to create a proactive repeat transmission list used to schedule the resending of data symbols that will be sent in a next transmission interval, as described above with reference to FIG. 1. The proactive repeat transmission analyzer/scheduler 126 uses an algorithm to create the proactive repeat transmission list that is identical to an algorithm used by the receiving equipment 600 to create the proactive repeat transmission request list described above with reference to FIG. 1. Consequently, the receiving equipment 600 and the sending equipment 200 create identical proactive repeat transmission lists, even though those lists are independently computed by the sending equipment 200 and the receiving equipment 600, as will be explained below in more detail with reference to FIGS. 6, 9, 13 and 14. In all other respects the sending equipment 200 is identical to the sending equipment 100 described above with reference to FIG. 1 and the description of the other components will not be repeated.

Figure 3:
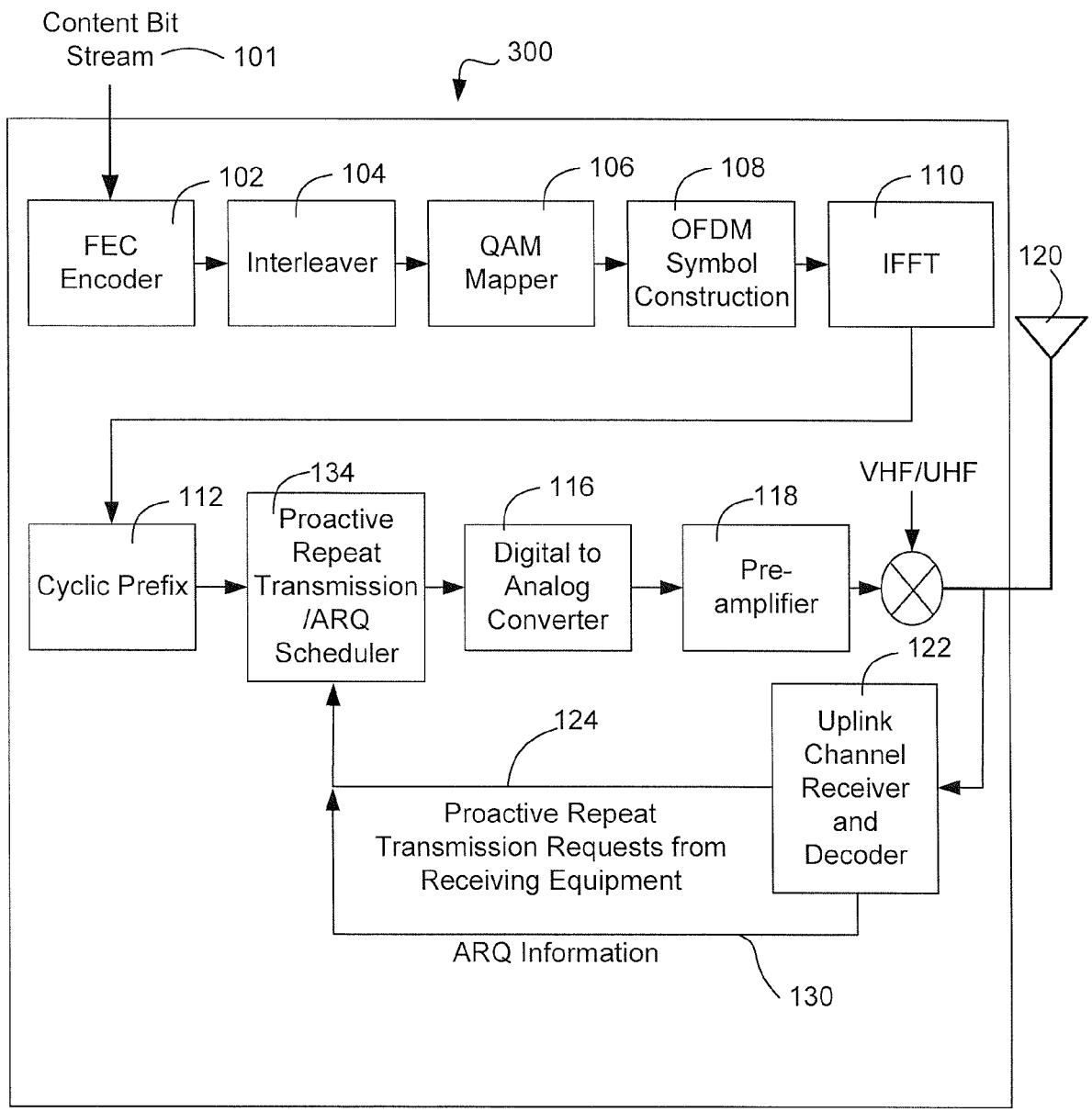
FIG. 3 is a schematic diagram of a further embodiment of sending equipment provisioned to provide proactive repeat transmission in accordance with the invention.

FIG. 3 is a schematic diagram of sending equipment 300 provisioned to provide proactive repeat transmission in accordance with the invention. The sending equipment 300 is identical to the sending equipment 100 described above with reference to FIG. 1, except that the sending equipment 300 is provisioned with a proactive repeat transmission/ARQ scheduler 134 that responds to ARQ protocol information 130 received on the uplink channel, as well as responding to the proactive repeat transmission lists 124. The sending equipment 300 is primarily intended for use in applications where complete data integrity is important. The ARQ protocol may be any ARQ protocol that meets the requirements of an application being served by the sending equipment 300. ARQ protocols are well known and exemplary ARQ protocols have been described above. As will be explained below in more detail, the sending equipment 300 performs the proactive repeat transmission of data units as described with reference to FIG. 1. If a data unit fails to decode correctly in spite of the proactive repeat transmission protocol, the ARQ protocol requests a repeat of the data unit until the data unit is correctly decoded.

Figure 4:
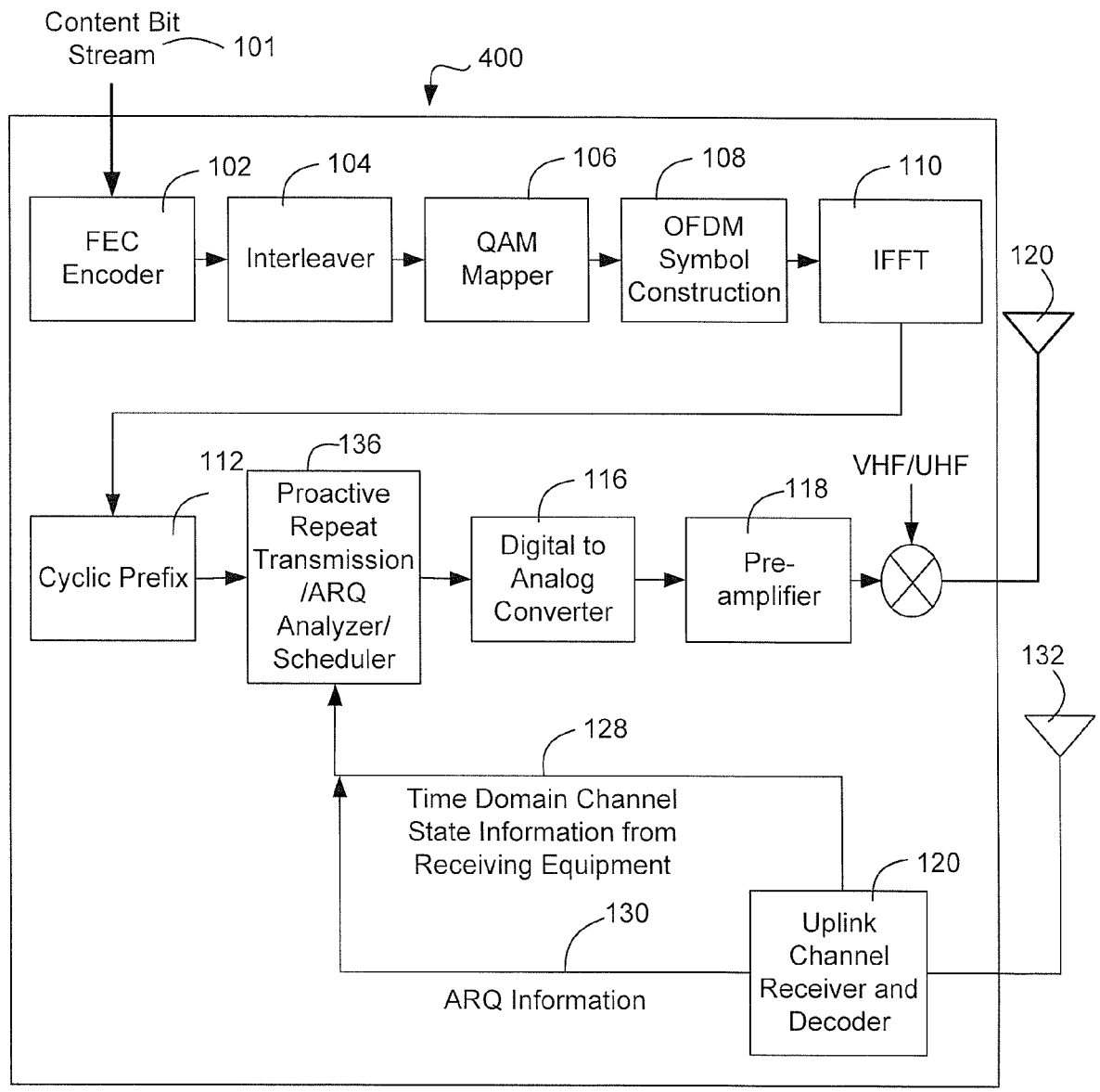
FIG. 4 is a schematic diagram of yet another embodiment of sending equipment provisioned to provide proactive repeat transmission in accordance with the invention.

FIG. 4 is a schematic diagram of sending equipment 400 provisioned to provide proactive repeat transmission in accordance with the invention. The sending equipment 400 is identical to the sending equipment 200 described above with reference to FIG. 2, except that the sending equipment 400 is provisioned with a proactive repeat transmission/ARQ analyzer/scheduler 136 that responds to ARQ information 130 received on the uplink channel, as well as the time domain channel state information 128 described above with reference to FIG. 2. The sending equipment 400 is also provisioned with a separate uplink receive antenna 132 connected to the uplink channel receiver and decoder 120. The sending equipment 400 is primarily intended for use in applications where complete data integrity is important. The ARQ protocol may be any ARQ protocol that meets the requirements of an application being served by the sending equipment 400. As noted above, several different ARQ protocols are well known in the art.

Figure 5:
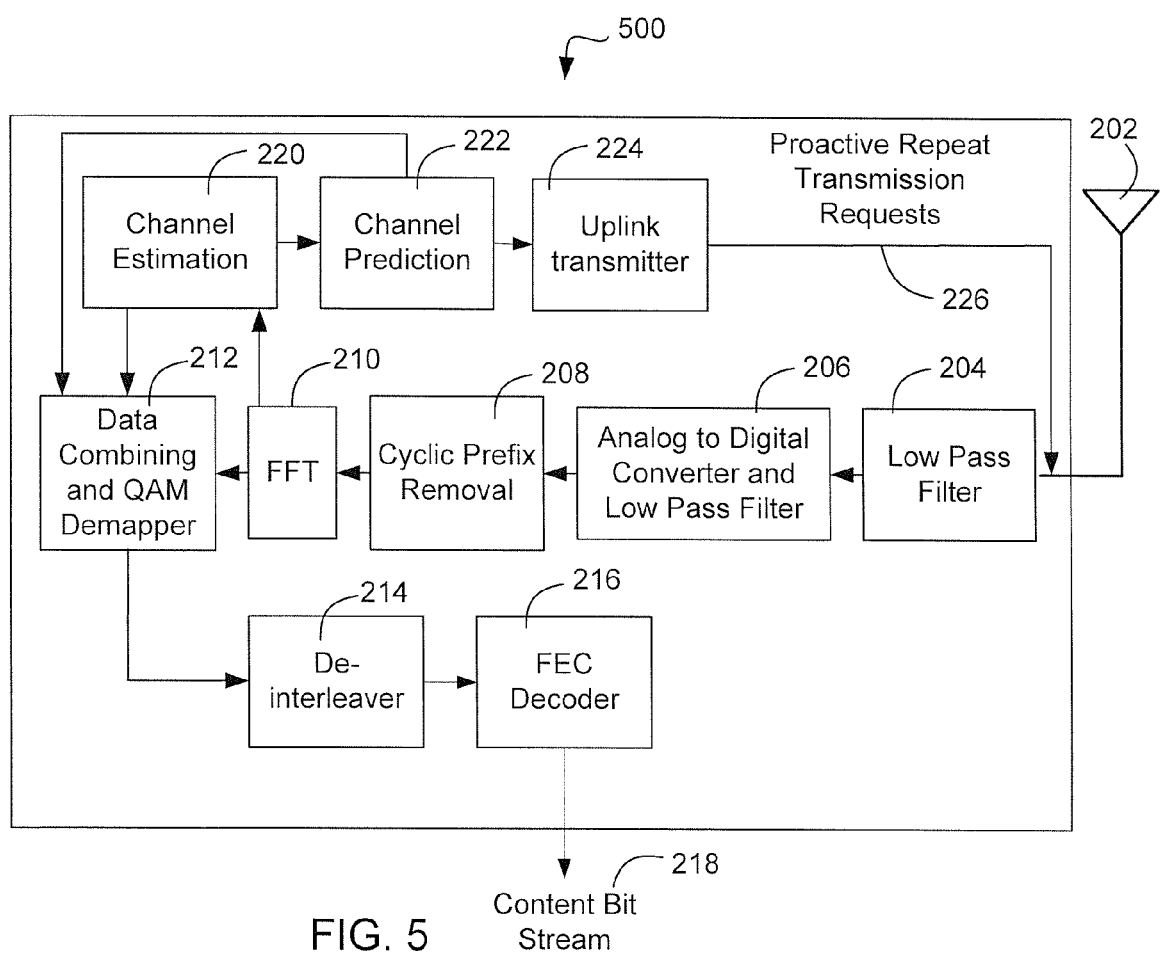
FIG. 5 is a schematic diagram of an embodiment of receiving equipment in accordance with the invention, which is provisioned to generate proactive repeat request lists that are sent over an uplink channel to the sending equipment shown in FIGS. 1 and 3.

FIG. 5 is a schematic diagram of receiving equipment 500 in accordance with the invention. The receiving equipment 500 is provisioned to generate the proactive repeat transmission request list 124 described above with reference to FIG. 1. The proactive repeat transmission request lists 124 are sent over the uplink channel to the sending equipment 100, 300 as described above with reference to FIGS. 1 and 3. The OFDM symbols sent over the downlink channel by the sending equipment 100 are received via an antenna 202. The received OFDM symbols are passed to a low pass filter 204, which smoothes the signal and removes unwanted components. The filtered signal is fed to an analog to digital converter (ADC) and low pass filter 206, which further smoothes the signal and converts the received signal to digital samples, which are distorted versions of the OFDM symbols sent by the sending equipment 100. The analog to digital converter and low pass filter 206 performs system synchronization to determine where each OFDM symbol starts and to correct the frequency and phase offsets due to hardware imperfections, etc. After time and frequency alignment, the redundant cyclic prefix described above with reference to FIG. 1 is removed by a cyclic prefix removal function 208 and the OFDM symbol is passed to a fast Fourier transform (FFT) 210 that transforms the distorted OFDM symbol back to the frequency domain. The output of the FFT 210 is passed to a data combining and QAM demapper 212, and to a channel estimation module 220. The channel estimation module 220 estimates and predicts distortions in the received signal, in a manner well known in the art. The signal distortion information is passed to the data combining and QAM demapper 212, which uses it to compensate and equalize those signal distortions before QAM de-mapping is performed.

In accordance with the invention, the channel estimation information is also passed to a channel prediction module 222 that uses the current channel estimation information to predict a condition of the downlink channel during a next transmit period. As understood by those skilled in the art, the multipath propagation channel $h(t,\tau,f_d)$ can be modeled as:

$$h(t, \tau, f_d) = \sum_{k=1}^{L} \alpha(k) \exp(j2\pi f_d t) p(t - \tau(k)) \qquad (1)$$

Where:
$\alpha(k)$ is the fading coefficient of the kth path with delay $\tau(k)$ of the total L major multipaths;
j is the imaginary sign, a complex number usually represented as A+jB, where: $\exp(j2\pi x)=\cos(2\pi x)+j\sin(2\pi x)$
$f_d$ is the Doppler frequency;
t is time; and
p(t) is the low pass shaping filter.

After the transmitted baseband signal s(t) propagates along multipaths, the received signal x(t) becomes:

$$x(t)=s(t) \otimes h(t,\tau,f_d)+n(t) \qquad (2)$$

Where n(t) is the combined effect of noise and interference. In the frequency domain X(f), this is equivalent to:

$$X(f)=S(f)H(f,f_d)+N(f) \qquad (3)$$

Where: S(f) is the Fourier transform of s(t); $H(f, f_d)$ is the Fourier transform of $h(t,\tau,f_d)$; and N(f) is the Fourier transform of n(t).

Consequently, the behavior of the multipath propagation channel $h(t,\tau\ f_d)$ directly affects decoder performance. Generally, $h(t, \tau, fd)$ can be assumed to be stationary for any given period of time. Consequently, the multipath propagation channel $h(t,\tau\ f_d)$ can be estimated and predicted using known sequences embedded in the transmitted signal, those sequences include pilot symbols, preamble, middle amble, etc. For example, if S(f), which is available at regular time intervals, is known then H(f, $f_d$) can be estimated using equation (4):

$$H(f,f_d)=X(f)/S(f)+N(f)/S(f) \quad (4)$$

Furthermore, h(t,τ,fd) can be predicted using previous and current estimates of H(f,$f_d$). More specifically, if the current estimates are α'(k), τ'(k) and f'$_d$, using data collected within the current time slot [0, T0], then the channel in the next time slot [T0, 2T0] can be estimated using equation (5):

$$h(t, \tau, f_d) = \sum_{k=1}^{L} \alpha'(k)\exp(j2\pi f'_d(t+T_0))p((t+T_0) - \tau'(k)) \quad (5)$$

In accordance with one embodiment of the invention, the channel prediction module 222 estimates the channel condition at a future time during which each data unit will be transmitted during a next transmit interval. If the resulting fast Fourier transform output includes a majority of components near zero, it is probable that the transmitted data unit will not decode correctly. As each transform is performed, a repeat transmission decision is made based on the number of near zero components in each Fourier transform output, and each repeat transmission decision is recorded in the proactive repeat transmission request list. As explained above with reference to FIG. 1, in one embodiment of the invention, data units that are to be repeated are represented by a "0" in the list while those that are not to be repeated are represented by a "1". After the proactive repeat transmission request list 124 is compiled for the next transmission interval, it is passed to the uplink transmitter 224 which formats the list in accordance with the uplink communications protocol being used, and transmits the list data to the sending equipment 100 via the antenna 202. The channel prediction module 222 also passes the proactive repeat transmission request list to the data combining and QAM demapper 212, which uses the list to combine the repeated OFDM symbols with the original OFDM symbols before the QAM demapping is performed. A demapped frame is passed to the de-interleaver 214, which reverses the bit interleaving performed by the interleaver 104 (FIG. 1). After de-interleaving, the frame is passed to a forward error correction (FEC) decoder 216, which decodes the frame and performs error correction in a manner well known in the art. If the frame cannot be decoded correctly, it is discarded. Otherwise, the content bits carried in the frame are added to the content bit stream 218, which is, for example, supplied to a high-definition television set (not shown).

Figure 6:
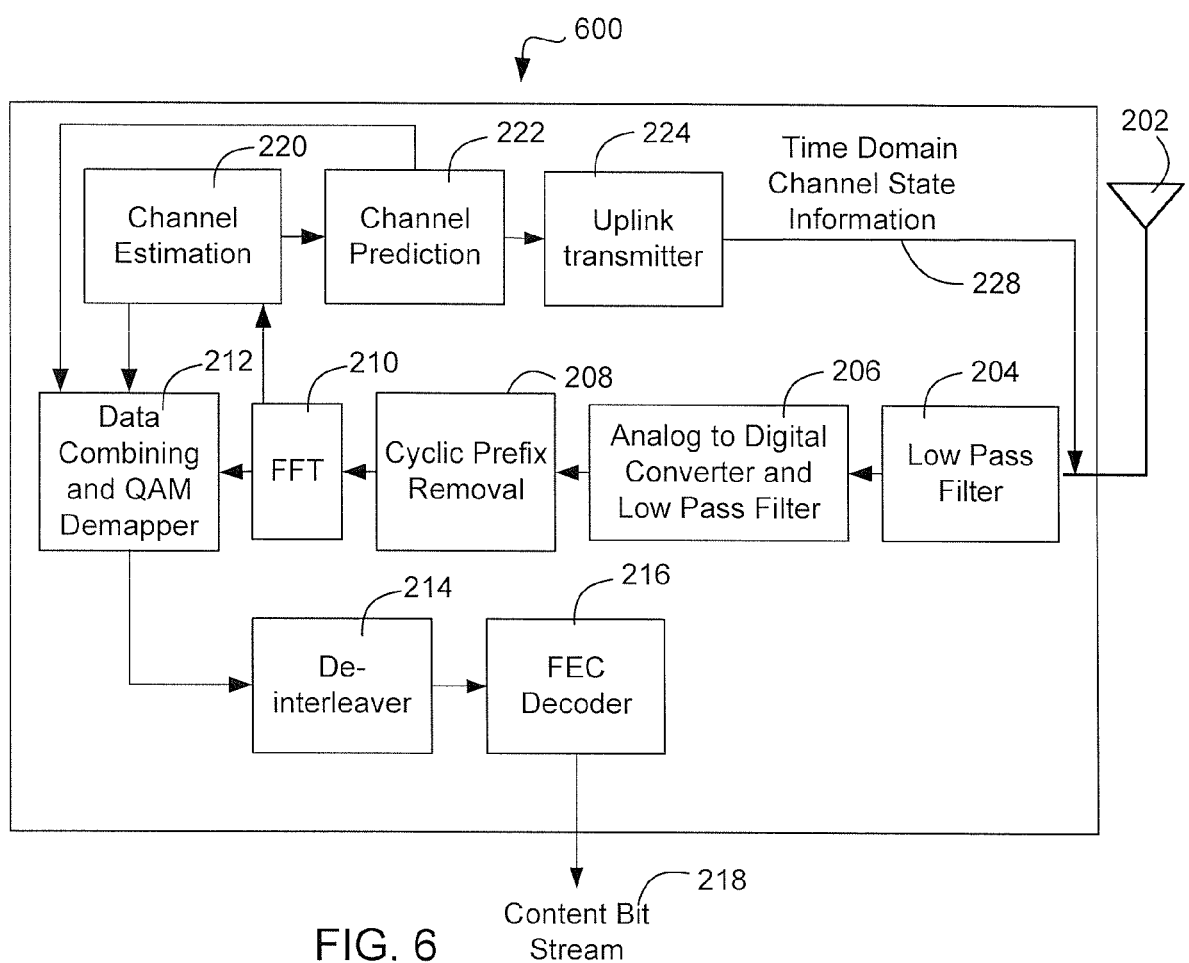
FIG. 6 is a schematic diagram of another embodiment of receiving equipment in accordance with the invention, which is provisioned to generate time domain channel state information that is sent over an uplink channel to the sending equipment shown in FIGS. 2 and 4.

FIG. 6 is a schematic diagram of receiving equipment 600 in accordance with the invention. The receiving equipment 600 is provisioned to generate time domain channel state information that is sent over the uplink channel to the sending equipment 200 shown in FIG. 2. Otherwise, the receiving equipment 600 is identical to the receiving equipment 500 described above with reference to FIG. 5, and a description of all the components and methodology of channel prediction will not be repeated here. As described above with reference to FIG. 2, the receiving equipment 600 sends a set of complex numbers (time domain channel state information 128) to the sending equipment 200. The sending equipment 200 uses the time domain channel state information 128 to create a proactive repeat transmission list using equation (5) and the methods described above with reference to FIG. 5. The set of complex numbers are passed to the uplink transmitter 208 before the channel prediction module 210 computes its own proactive repeat transmission request list 124 for the next transmission interval. That proactive repeat transmission request list 124 is then passed to the data combining and QAM demapper 212, as explained above with reference to FIG. 5.

Figure 7:
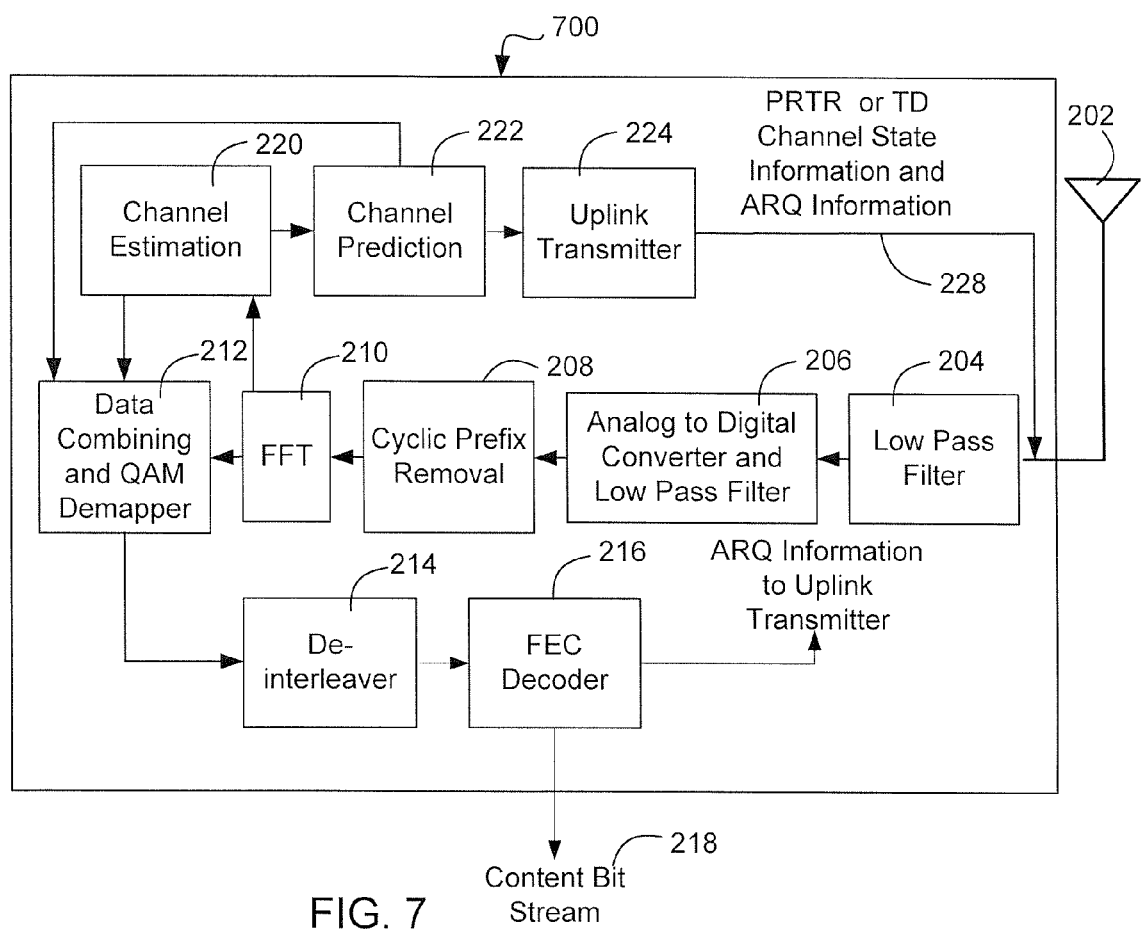
FIG. 7 is a schematic diagram of an embodiment of receiving equipment in accordance with the invention, which is provisioned to generate proactive repeat transmission request lists (PRTR) or time domain (TD) channel state information and ARQ protocol information, which are respectively sent over an uplink channel to the sending equipment shown in FIGS. 3 and 4.

FIG. 7 is a schematic diagram of receiving equipment 700 in accordance with the invention. The receiving equipment 700 is provisioned to generate proactive repeat transmission request lists 124, as described above with reference to FIG. 5; or time domain (TD) channel state information 128 as described above with reference to FIG. 6; and, ARQ information when required, as explained above with reference to FIGS. 3 and 4. In all other respects the receiving equipment 700 is identical to the receiving equipment 500 and 600 explained in detail with reference to FIGS. 5 and 6, and that explanation will not be repeated here.

Figure 8:
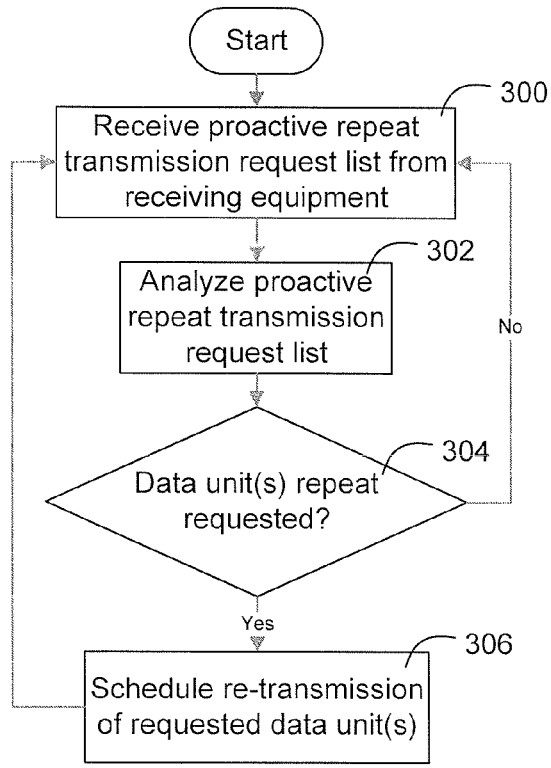
FIG. 8 is a flowchart providing a simplified overview of actions taken by the sending equipment shown in FIG. 1 when it receives a proactive repeat transmission request list from the sending equipment shown in FIG. 5.

FIG. 8 is a flowchart providing a simplified overview of actions taken by the sending equipment 100 shown in FIG. 1 when it receives a proactive repeat transmission request list 124 from the sending equipment 500 shown in FIG. 5. As explained above with respect to FIG. 1 and FIG. 5, the sending equipment 100 receives (300) the proactive repeat transmission request list 124 from the sending equipment 500, and analyzes (302) the proactive repeat transmission request list to determine (304) if the list contains a request for the repeat transmission of any data unit(s) to the sent in a next transmission interval. As explained above, in accordance with one embodiment of the invention any data units to be repeated are represented by a "0" in the proactive repeat transmission request list. If it is determined that any data units are to be repeated, the proactive repeat transmission scheduler 114 (FIG. 1), schedules the repeat transmission of those data units. In accordance with one embodiment of the invention, the data units are OFDM symbols that are sent in Wireless Fidelity (WiFi) or Worldwide Inter-operability for Microwave Access (WiMAX) frames of 500 OFDM symbols each (64-QAM, ¾ rate) to deliver high-definition television content to the receiving equipment 100 using TV white space bandwidth. The repeated OFDM symbols are sent without FEC encoding after the end of the frame with which they are associated.

Figure 9:
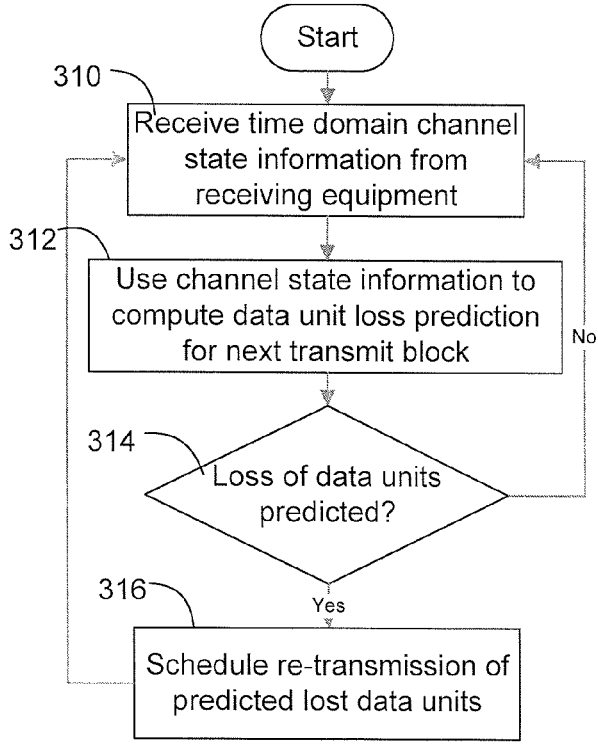
FIG. 9 is a flowchart providing a simplified overview of the actions taken by the sending equipment shown in FIG. 2 when it receives time domain channel state information from the sending equipment shown in FIG. 6.

FIG. 9 is a flowchart providing a simplified overview of the actions taken by the sending equipment 200 shown in FIG. 2 when it receives (310) time domain channel state information 128 (FIG. 2) from the sending equipment 600 shown in FIG. 6. As explained above with reference to FIG. 2, the sending equipment 200 uses the time domain channel state information 128 to compute a data loss prediction for the next transmit block, i.e. to construct the proactive repeat transmission list used to determine which OFDM symbols are to be repeated after the next data frame is sent. The sending equipment 200 then determines whether any data units (OFDM symbols) in the next frame will not decode correctly, i.e. whether the data units will be lost. If the prediction is that none will be lost, the process returns to step 310. Otherwise, the proactive repeat transmission list is used to schedule the retransmission of the data units predicted to be lost in the next frame. As explained above, those data units are sent immediately after the next frame is sent in the order they appear in that frame.

Figure 10:
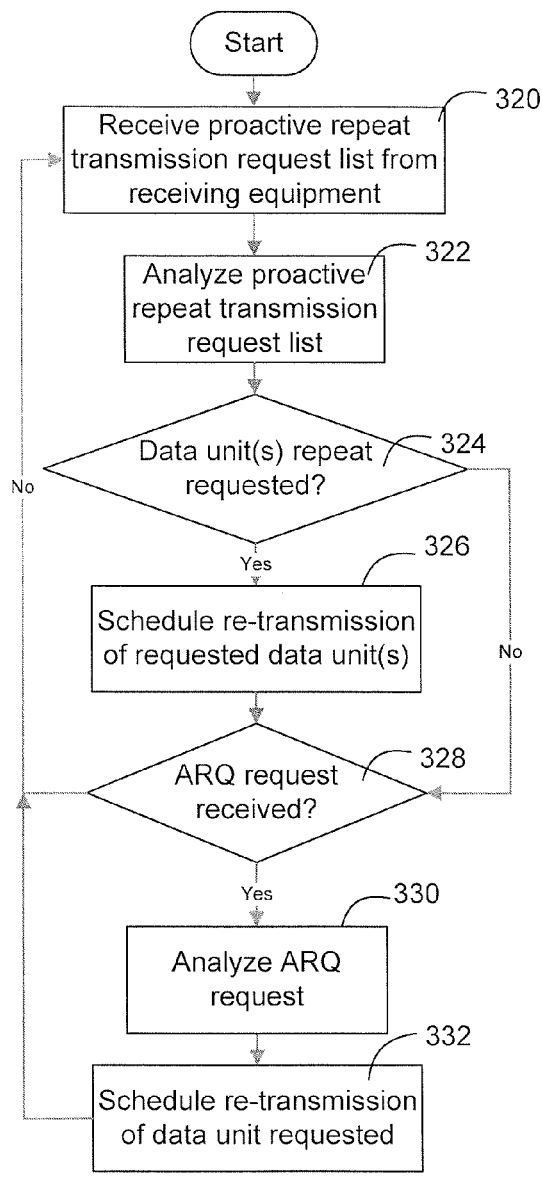
FIG. 10 is a flowchart providing a simplified overview of the actions taken by the sending equipment shown in FIG. 3 when it receives a proactive repeat transmission request list or automatic repeat request information from the sending equipment shown in FIG. 7.

FIG. 10 is a flowchart providing a simplified overview of the actions taken by the sending equipment 300 shown in FIG. 3 when it receives a proactive repeat transmission request list 124 or automatic repeat request information 130 from the sending equipment 700 shown in FIG. 7. When the proactive repeat transmission list 124 is received (320) it is analyzed (322) to determine (324) if any data units that to be sent in the next transmission interval must be repeated. If not, the processes branches to step 328, which will be explained below. If so, those data units are scheduled for retransmission by the proactive repeat transmission/ARQ scheduler 134, as described above with reference to FIG. 3. It is then determined (328) whether an ARQ request has been received requesting retransmission of a frame that was sent in the last transmission interval. If not, the process returns to step 320 to await receipt of the next proactive repeat transmission list. However, if an ARQ request has been received, the request is analyzed (330) and the retransmission (332) of the requested data unit is scheduled for re-transmission before the process returns to step 320.

Figure 11:
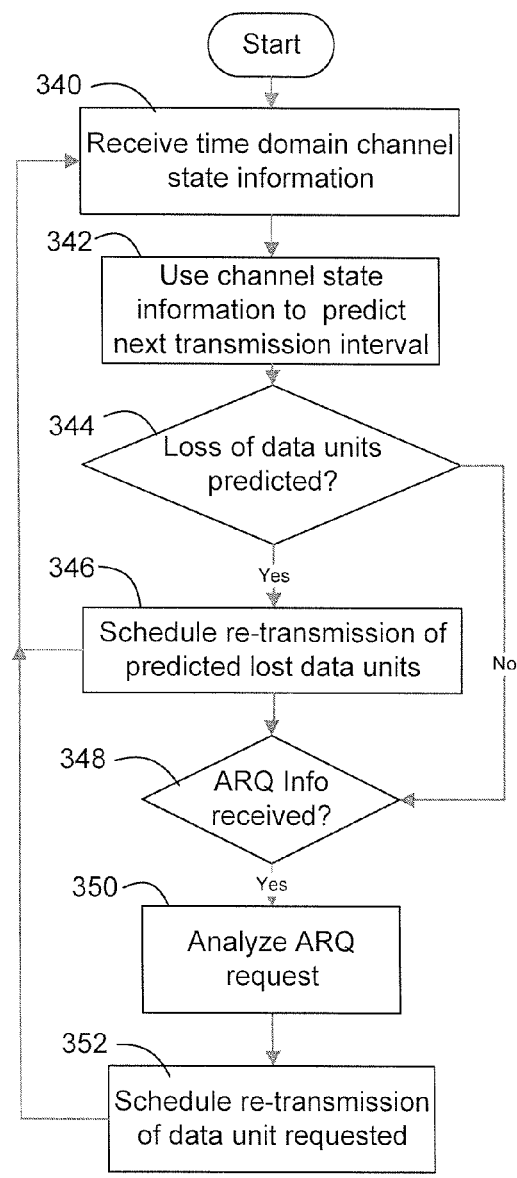
FIG. 11 is a flowchart providing a simplified overview of the actions taken by the sending equipment shown in FIG. 4 when it receives time domain channel state information or automatic repeat request information from the sending equipment shown in FIG. 7.

FIG. 11 is a flowchart providing a simplified overview of the actions taken by the sending equipment 400 shown in FIG. 4 when it receives time domain channel state information 128 or automatic repeat request information 130 from the sending equipment 700 shown in FIG. 7. When the time domain channel state information is received (340), it is processed using the equations described above with reference to FIG. 5 to predict the next transmission interval, i.e. to prepare the proactive repeat transmission list for that transmission interval. The list is then analyzed (344) to determine whether and data units are predicted to be lost. If no data units are predicted to be lost, the process branches back to step 348, as will be explained below. If it is predicted that one or more data units will be lost, the proactive repeat transmission list is used by the proactive repeat transmission/ARQ analyzer/scheduler 136 to schedule (346) the retransmission of those data units predicted to be lost. It is then determined (348) whether an ARQ request has been received requesting retransmission of a frame that was sent in a prior transmission interval. If not, the process returns to step 340 to await receipt of the next proactive repeat transmission list. However, if an ARQ request has been received, the request is analyzed (350) and the retransmission of the requested data unit is scheduled (352) for re-transmission before the process returns to step 340.

Figures 12, 13:
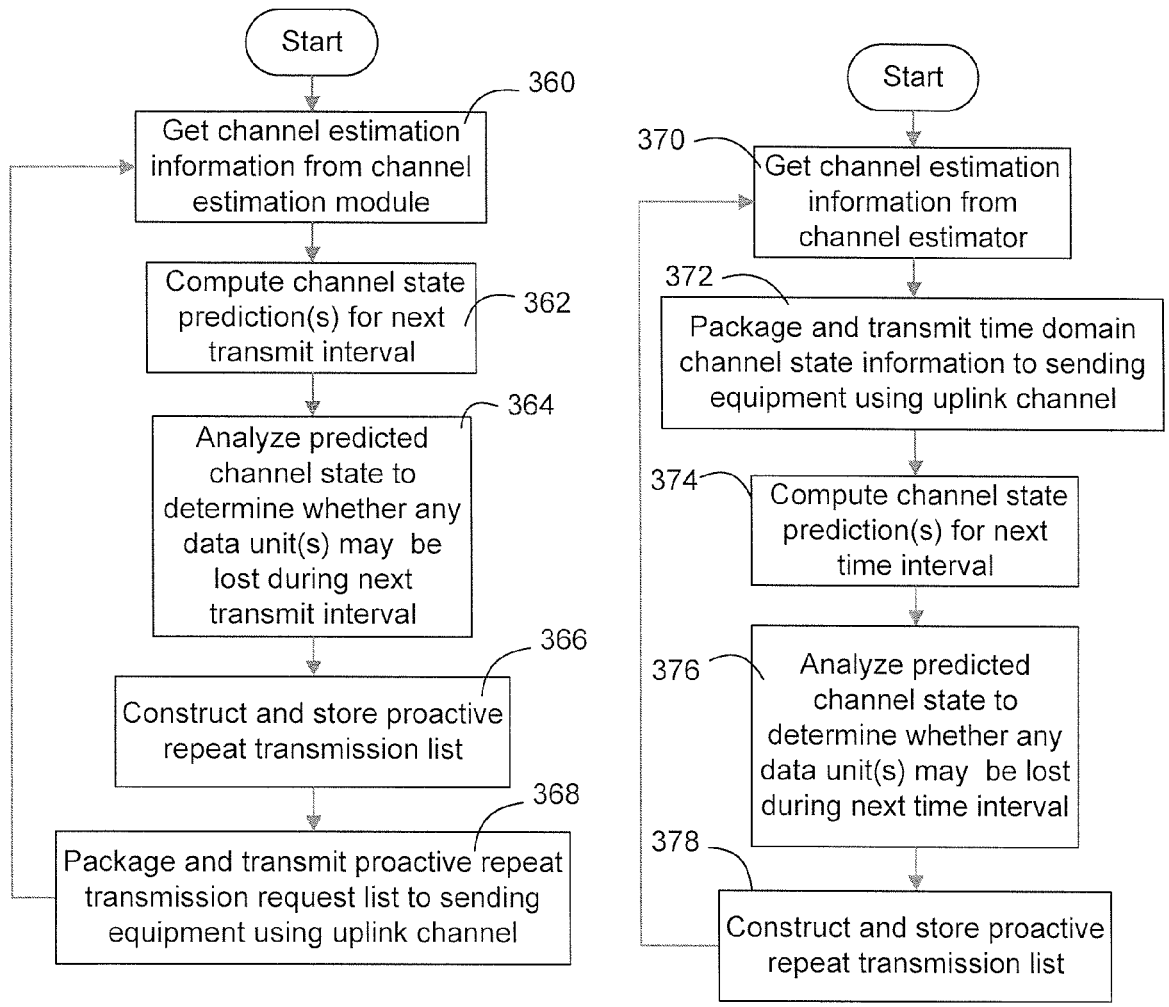
FIG. 12 is a flowchart providing a simplified overview of the actions taken by the receiving equipment shown in FIGS. 5 and 7 when it prepares a proactive repeat transmission request list and transmits the list to the sending equipment shown in FIG. 1 or 3.
FIG. 13 is a flowchart providing a simplified overview of the actions taken by the receiving equipment shown in FIGS. 6 and 7 when it prepares time domain channel state information and transmits the time domain channel state information to the sending equipment shown in FIG. 2 or 4.

FIG. 12 is a flowchart providing a simplified overview of the actions taken by the receiving equipment 500, 700 shown in FIGS. 5 and 7 when it prepares a proactive repeat transmission request list 124 and transmits the list data to the sending equipment shown 100, 300 in FIGS. 1 and 3. As explained above with reference to FIG. 5, the channel prediction module 222 of the sending equipment 500, 700 gets (360) the channel estimation information from the channel estimation module 220. The channel prediction module 222 then computes (362) the channel state predictions for the next transmission interval. The channel state information is analyzed (364) to determine whether any data units may be lost in that transmission interval, and that information is used to construct (366) the proactive repeat transmission list. A copy of the proactive repeat transmission list is passed to the data combiner and QAM demapper 212. The proactive repeat transmission list is then packaged and transmitted (368) to the sending equipment 100, 300 using the uplink channel, as described above with reference to FIG. 5.

FIG. 13 is a flowchart providing a simplified overview of actions taken by the receiving equipment 600, 700 shown in FIGS. 6 and 7 when time domain channel state information is prepared and sent to the sending equipment 200, 400 shown in FIGS. 2 and 4. As explained above with reference to FIG. 6, the channel prediction module 222 of the sending equipment 600, 700 gets (370) the channel estimation information from the channel estimation module 220. The time domain channel state information is then packaged and transmitted immediately (372) to the sending equipment 200, 400 using the uplink channel. The channel prediction module 222 then computes (374) the channel state predictions for the next transmission interval. The channel state predictions are analyzed (376) to determine whether any data units may be lost during that transmission interval, and that information is used to construct (378) the proactive repeat transmission list, which is passed to the data combiner and QAM demapper 212. The process then returns to step 370 to await receipt of the next set of channel estimation information from the channel estimation module 220.

Figure 14:
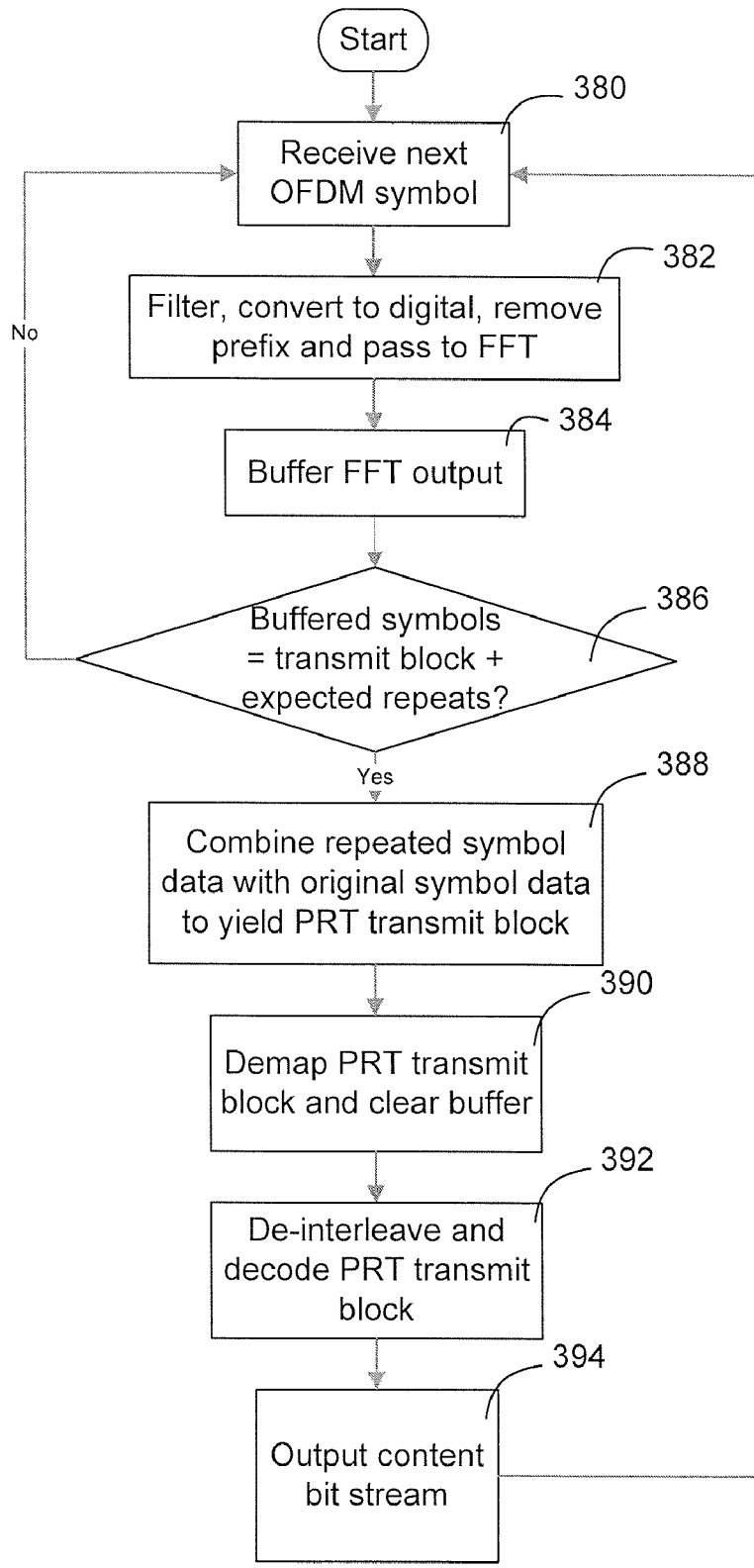
FIG. 14 is a flowchart providing a simplified overview of the actions taken by the receiving equipment shown in FIGS. 5 and 6 when the receiving equipment processes OFDM symbols sent by the sending equipment shown in FIG. 1 or 2.

FIG. 14 is a flowchart providing a simplified overview of actions taken by the receiving equipment 500, 600 shown in FIGS. 5 and 6 when the receiving equipment processes OFDM symbols sent by the sending equipment 100, 200 shown in FIG. 1 or 2. As explained above, in one embodiment of the invention the receiving equipment 500, 600 sequentially receives (380) the transmitted OFDM symbols sent by the sending equipment 100, 200. Each OFDM symbol signal is filtered by the low pass filter 204 and converted to a digital sample by the analog to digital converter and low pass filter 206. The cyclic prefix is then removed by the cyclic prefix removal module 208 and the digital representations of the OFDM symbol are passed (382) to the FFT 210. The output of the FFT 210 is buffered (384) by the data combining and QAM mapper 212. It is then determined (386) whether the number of OFDM symbols in the buffer equals the number of OFDM symbols in the frame (transmit block) plus the number of expected repeated symbols. If not, the process returns to step 380 to receive and process another OFDM symbol. If so, the repeated OFDM symbols identified by the proactive repeat transmission request list are combined (388) with the corresponding data symbols in the received frame (transmit block). The frame is then demapped by the data combining and QAM demapper 212 and the buffer is cleared (390). The de-interleaver 214 de-interleaves the frame data and the FEC decoder 216 decodes the frame data and performs forward error correction before outputting (394) the content bit stream. The process then returns to step 380 to begin receiving a next transmit block.

Figure 15:
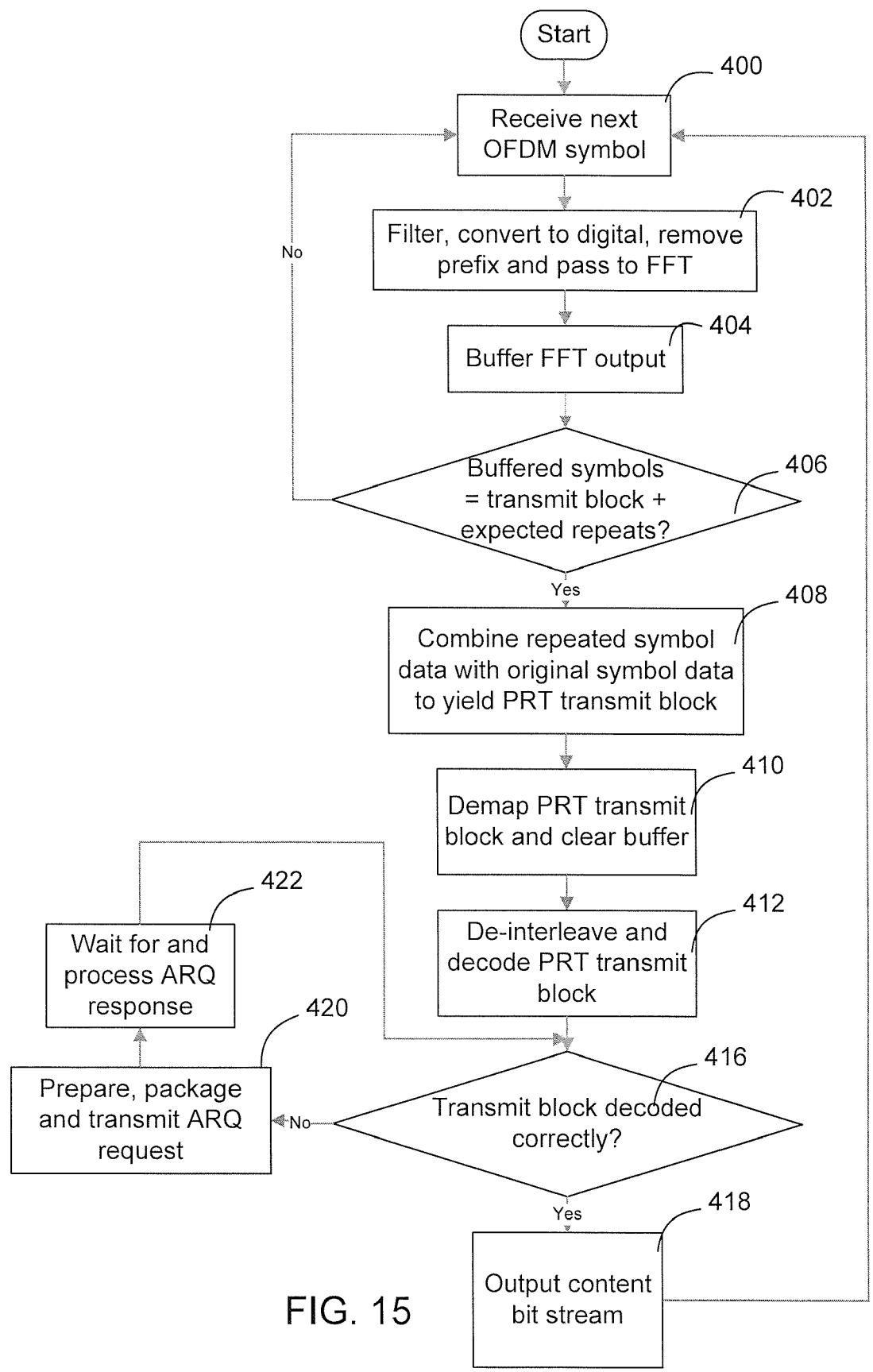
FIG. 15 is a flowchart providing a simplified overview of the actions taken by the receiving equipment shown in FIG. 7 when the receiving equipment processes OFDM symbols sent by the sending equipment shown in FIG. 3 or 4.

FIG. 15 is a flowchart providing a simplified overview of the actions taken by the receiving equipment 700 shown in FIG. 7 when the receiving equipment 700 processes OFDM symbols sent by the sending equipment 300, 400 shown in FIGS. 3 and 4. The receiving equipment 700 sequentially receives (400) OFDM symbols sent by the sending equipment 300, 400. Each OFDM symbol signal is filtered by the low pass filter 204 and converted to a digital sample by the analog to digital converter and low pass filter 206. The cyclic prefix is then removed by the cyclic prefix removal module 208 and the digital representations of the OFDM symbol are passed to the FFT 210 (402). The output of the FFT 210 is buffered (404) by the data combining and QAM mapper 212. It is then determined (406) whether the number of OFDM symbols in the buffer equals the number of OFDM symbols in the frame (transmit block) plus the number of expected repeated symbols. If not, the process returns to step 400 to receive and process another OFDM symbol. If so, the repeated OFDM symbols identified by the proactive repeat transmission request list are combined (408) with the corresponding data symbols in the received frame (transmit block). The frame is then demapped by the data combining and QAM demapper 212 and the buffer is cleared (410). The de-interleaver 214 then de-interleaves the frame data and the FEC decoder 216 decodes the frame data and performs forward error correction (412). It is then determined whether the frame decoded correctly (416), i.e. whether the forward error correction was able to correct all of the transmit errors in the frame data. If not, an ARQ request is prepared in a manner known in the art and transmitted (420) to the sending equipment 300, 400. The sending equipment then processes the ARQ request in a manner dependent on the ARQ protocol (422). When it is determined that the transmit block has decoded correctly (416), the content bit stream is output (418). The process then returns to step 400 to begin receiving a next transmit block.

Although the invention has been described with reference to WiFi or WiMAX data frames, it should be understood that it is applicable to any known data transmission protocol and can improve throughput as well as QoS. The invention also provides a significant improvement over "best effort" data transmission protocols for time-critical data applications, such as high-definition television transmissions.

It should be noted that the embodiments of the invention described above are exemplary only, and do not represent a complete description of every possible configuration of any system or any method for proactive repeat transmission of data units sent using an unreliable transmission medium, even though the description enables one skilled in the art to construct such a system and implement the methods disclosed. The scope of the invention is therefore intended to be limited solely by the scope of the appended claims.

We claim:

1. A system for proactive repeat transmission of data units sent using an unreliable transmission medium, comprising:
   sending equipment adapted to receive a proactive repeat transmission request list and schedule the repeat transmission of data units specified in each proactive repeat transmission request list after data units associated with the proactive repeat transmission request list have been sent using the unreliable transmission medium; and
   receiving equipment adapted to analyze data units received via a downlink channel used by the sending equipment to predict a condition of that downlink channel during a next transmission interval, and further adapted to construct the proactive repeat transmission request lists using the predicted condition, and to send a proactive repeat transmission request list to the sending equipment via an uplink channel before the data units associated with the proactive repeat transmission request list have been sent,
   wherein the receiving equipment further comprises a channel estimation module that receives output from a fast Fourier transform of data units received from the sending equipment via the downlink channel and computes time domain channel state information using the fast Fourier transform output.

2. The system as claimed in claim 1 wherein the sending equipment further comprises a proactive repeat transmission scheduler that receives the proactive repeat transmission request list from an uplink channel receiver and decoder, and schedules the repeat transmission of the data units.

3. The system as claimed in claim 1 wherein the sending equipment further comprises a proactive repeat transmission and automatic repeat request (ARQ) scheduler adapted to receive the repeat transmission request list as well as automatic repeat request information from the sending equipment.

4. The system as claimed in claim 3 wherein the receiving equipment further comprises a channel prediction module that receives the time domain channel state information and computes a predicted condition of the downlink channel for each data unit to be sent during a next transmission interval to construct the proactive repeat transmission request list that is sent to the sending equipment.

5. The system as claimed in claim 4 wherein the receiving equipment further comprises a data combining and quadrature amplitude modulation (QAM) demapper that receives a copy of the repeat transmission request list and uses the repeat transmission request list to: determine when all of the data units have been received in the next transmission interval; and, to combine repeated data units with original data units sent by the sending equipment before the original data units are demapped by the QAM demapper.

6. A system for proactive repeat transmission of data units sent using an unreliable transmission medium, comprising:
   sending equipment adapted to receive time domain channel state information and to analyze the time domain channel state information to construct a proactive repeat transmission request list; and, further adapted to schedule the repeat transmission of data units specified in the proactive repeat transmission request list after data units associated with the proactive repeat transmission request list have been sent using the unreliable transmission medium; and
   receiving equipment adapted to analyze data units received via a downlink channel used by the sending equipment to: compute the time domain channel state information; and, predict a condition of that downlink channel during a next transmission interval; and further adapted to construct a corresponding proactive repeat transmission request list using the predicted condition of the downlink channel.

7. The system as claimed in claim 6 wherein the sending equipment further comprises a proactive repeat transmission scheduler that receives the proactive repeat transmission request list constructed by the sending equipment and schedules the repeat transmission of the data units.

8. The system as claimed in claim 6 wherein the sending equipment further comprises a proactive repeat transmission and automatic repeat request (ARQ) scheduler adapted to receive the repeat transmission request list constructed by the sending equipment as well as automatic repeat request information sent by the sending equipment.

9. The system as claimed in claim 6 wherein the receiving equipment further comprises a channel estimation module that receives output from a fast Fourier transform of data units received by the receiving equipment via the downlink channel, and computes the time domain channel state information using the fast Fourier transform output.

10. The system as claimed in claim 9 wherein the receiving equipment further comprises a channel prediction module that receives the time domain channel state information, sends the time domain channel state information to the sending equipment, and uses the time domain channel state information to compute a corresponding proactive repeat transmission request list.

11. The system as claimed in claim 10 wherein the receiving equipment further comprises a data combining and quadrature amplitude modulation (QAM) demapper that receives the corresponding repeat transmission request list and uses the corresponding repeat transmission request list to: determine when all of the data units have been received in the next transmission interval; and, to combine repeated data units with original data units sent by the sending equipment before the original data units are demapped by the QAM demapper.

12. A method of sending data units to receiving equipment using an unreliable transmission medium, comprising:
   computing a predicted condition of a downlink channel, to determine which of a predetermined number of the data units to be sent are data units likely to decode incorrectly during a transmit interval when the predetermined number of the data units are to be sent, wherein computing the predicted condition of the downlink channel comprises using channel estimation information extracted from a signal received via the downlink channel by the receiving equipment to predict the condition of the downlink channel during a transmit interval when the predetermined number of data units are to be sent;

scheduling a proactive repeat transmission of the data units likely to decode incorrectly so that the proactive repeat transmission of the data units occurs after the predetermined number of data units are sent by sending equipment to the receiving equipment via the downlink channel; and creating a proactive repeat transmission request list using the predicted condition of the downlink channel and sending the proactive repeat transmission request list to the sending equipment via an uplink channel before the predetermined number of data units are to be sent by the sending equipment.

13. The method as claimed in claim 12 wherein computing a predicted condition of the downlink channel over which the data units are to be sent comprises: using time domain channel state information computed by the receiving equipment using information extracted from a signal received via the downlink channel and sent by the receiving equipment to the sending equipment before the predetermined number of data units are to be sent; whereby the sending equipment predicts the condition of the downlink channel when the predetermined number of data units are to be sent using the time domain channel state information received from the receiving equipment, and uses the predicted condition of the downlink channel to compile a proactive repeat transmission list that is used to schedule the proactive repeat transmission of the data units predicted to decode incorrectly.

14. The method as claimed in claim 13 wherein a proactive repeat transmission scheduler schedules the proactive repeat transmission of the data units using the proactive repeat transmission request list compiled by the sending equipment.

15. The method as claimed in claim 12 further comprising respectively storing in a buffer of the receiving equipment each of the predetermined number of the data units as well as repeated data units; and, combining the repeated data units with corresponding ones of the predetermined number of data units before the predetermined number of data units are decoded.

16. The method as claimed in claim 15 further comprising sending automatic repeat request (ARQ) information from the receiving equipment to the sending equipment in an event that the predetermined number of data units fail to decode correctly.

17. A method of sending high-definition television content to receiving equipment using TV white space bandwidth, comprising:

computing a predicted condition of a downlink channel over which a predetermined number of the data units are to be sent, to determine which of the predetermined number of the data units to be sent are data units likely to decode incorrectly; and scheduling a proactive repeat transmission of the data units likely to decode incorrectly so that the proactive repeat transmission of the data units occurs after the predetermined number of data units are sent by sending equipment to the receiving equipment via the downlink channel;

wherein computing a predicted condition of the downlink channel over which the data units are to be sent comprises using time domain channel state information computed by the receiving equipment using information extracted from a signal received via the downlink channel and sent by the receiving equipment to the sending equipment before the predetermined number of data units are to be sent, whereby the sending equipment predicts the condition of the downlink channel when the predetermined number of data units are to be sent using the time domain channel state information received from the receiving equipment, and uses the predicted condition of the downlink channel to compile a proactive repeat transmission list that is used to schedule the proactive repeat transmission of the data units predicted to decode incorrectly.

* * * * *